United States Patent
Lee et al.

(10) Patent No.: US 7,457,356 B2
(45) Date of Patent: Nov. 25, 2008

(54) METHOD OF INITIALIZING EQUALIZER OF DIGITAL TELEVISION RECEIVER AND EQUALIZER USING THE SAME

(75) Inventors: Yong Hwan Lee, Seoul (KR); Jong Moon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 729 days.

(21) Appl. No.: 10/979,829

(22) Filed: Nov. 1, 2004

(65) Prior Publication Data

US 2005/0123034 A1    Jun. 9, 2005

(30) Foreign Application Priority Data

Oct. 31, 2003    (KR) .................. 10-2003-0076927

(51) Int. Cl.
    *H03K 5/159*    (2006.01)
(52) U.S. Cl. ............... 375/233; 375/229; 375/231; 375/232; 375/316
(58) Field of Classification Search .......... 375/232, 375/229, 233, 324, 231, 316
See application file for complete search history.

(56) References Cited

U.S. PATENT DOCUMENTS

| | | | |
|---|---|---|---|
| 2002/0159543 A1 * | 10/2002 | Perlow et al. | 375/324 |
| 2004/0101068 A1 * | 5/2004 | Wang et al. | 375/324 |
| 2004/0240587 A1 * | 12/2004 | Ozen | 375/340 |

FOREIGN PATENT DOCUMENTS

KR    1020020077995 A    10/2002

* cited by examiner

*Primary Examiner*—Mohammad Ghayour
*Assistant Examiner*—Leila Malek
(74) *Attorney, Agent, or Firm*—Lee, Hong, Degerman, Kang & Waimey

(57) ABSTRACT

A method of initializing an equalizer of VSB DTV receiver and an equalizer using the same are provided. The method includes the steps of: obtaining a channel estimation value by estimating an impulse response of a channel from a received signal, initializing a backward filter by using the channel estimation value; generating an imaginary training signal by an arithmetical operation for the channel estimation value and a generated known training sequence; and initializing a forward filter by using the imaginary training signal.

14 Claims, 5 Drawing Sheets

METHOD OF INITIALIZING EQUALIZER OF DIGITAL TELEVISION RECEIVER AND EQUALIZER USING THE SAME

This application claims the benefit of the Korean Application No. 10-2003-0076927 filed on Oct. 31, 2003, which is hereby incorporated by reference.

BACKGROUND OF THE INVENTION

1. Field of the Invention

The present invention relates to an equalizer of a vestigial sideband (VSB) digital television (DTV) receiver, and more particularly, to a method of initializing an equalizer of a VSB DTV receiver and an equalizer using the same.

2. Discussion of the Related Art

Generally, in a wireless data transceiving system, transmission signals are distorted by bandwidth-limited and multipath channels, whereby an inter-symbol interference (ISI) is generated.

Such an ISI distorts transmission signals and causes bit errors in a receiver.

Accordingly, in order to restore signals distorted by an ISI, a receiver uses an equalizer and the equalizer needs to be firstly initialized.

FIG. 1 is a block diagram of a general VSB DTV system.

As shown in FIG. 1, the general VSB DTV system includes a transmitter 110 and a receiver 120 mutually connected by channels.

Here, the transmitter 110 encodes a signal and converts the encoded signal into an 8-level pulse amplitude modulation (PAM) signal by using a scrambler 111, a Reed-Solomon (RS) encoder 112, an interleaver 113 and a trellis coded modulation (TCM) encoder (Trellis encoder) 114.

Thereafter, the transmitter 110 multiplexes the 8-level PAM signal with a synchronization signal by using a multiplexer (MUX) 115, and inserts a pilot signal into the multiplexed signal by using a pilot inserter 116.

Then, the transmitter 110 filters and modulates the pilot signal-containing signal by using a VSB shaping filter 117 and a modulator 118, and transmits the resulting signal to the receiver 120.

The signal transmitted from the transmitter 110 to the receiver 120 is linearly distorted while passing through a channel.

In the receiver 120, the signal having passed through the channel is then converted into a baseband signal by a carrier recoverer 121. The resulting baseband signal is filtered by a RX (receive) filter 122, and the filtered signal is then synchronized by an interpolator 123, a timing recoverer 124 and a sync detector 125.

The synchronized signal is then equalized by an equalizer 126 for compensation of the signal for a linear distortion caused by a channel.

The receiver 120 then restores the equalized signal by using a phase tracker, a demultiplexer (DEMUX), a TCM decoder, a deinterleaver, an RS decoder and a descrambler.

At this time, the equalizer 126 is required to generate an output having a signal-to-noise ratio (SNR) as high as to enable viewers to view a DTV.

Accordingly, the equalizer 126 must be quickly initialized so that viewers cannot feel a delay time.

Instead of conventional DFE, a fractionally-spaced modified decision feedback equalizer (FS-MDFE) can be used in a DTV receiver.

FIG. 2 is a block diagram of an FS-MDFE.

A general DFE firstly performs a signal processing in a forward filter for removing a precursor, an interference component caused by symbols behind a current symbol, and then performs a signal processing in a backward filter for removing a postcursor, an interference component caused by symbols before the current symbol.

On the contrary, as shown in FIG. 2, the FS-MDFE firstly performs a signal processing in a backward filter, and then performs a signal processing in a forward filter.

The FS-MDFE estimates channel properties, and then can easily initialize a coefficient of a backward filter by using the estimated channel properties.

Accordingly, in case that an equalizer is initialized by training, the FS-MDFE needs to train only a coefficient of a forward filter, and therefore has a short initialization time.

An operation of the FS-MDFE will now be described in detail with reference to FIG. 2.

Referring to FIG. 2, in the FS-MDFE, an input 210 of a forward filter is reduced by a postcursor component 220 calculated by a backward filter, and then the resulting value is stored in a first memory of the forward filter.

These values are sequentially stored in respective memories 230 of the forward filter, wherein each value is reduced by a multiplication of a backward filter coefficient 240 connected to each memory 230 and an already-detected symbol 260 stored in each backward filter memory 250.

Then, this subtracted value is removed in calculating a postcursor component that should be removed at each forward filter tap through a backward filter signal processing.

The so-obtained value 270 is multiplied by each forward filter coefficient 280, and a polyphase sum value of the resulting values becomes an input ($Z_n$) 291 of a slicer 292.

Then, outputs 293 of the slicer 292 are sequentially stored in the backward filter.

By repetition of the aforementioned processes, a signal transmitted from a transmitter can be obtained from the output 293 of the slicer 292.

Here, it is assumed that forward filter coefficients were initialized. However, in practice, forward filter coefficients need to be properly initialized.

For a method of initializing the FS-MDFE, there is a method using a LMS (Least Mean Square) training technique.

However, in case of this method, since a training signal is very short in length compared with a data signal, a forward filter of the FS-MDFE cannot be initialized only by the training signal.

Also, for a method of initializing the FS-MDFE, there is an MMSE (Minimum Mean Squared Error) initialization method. However, this method cannot be practically used owing to high packaging complexity caused by an inverse operation of a matrix.

SUMMARY OF THE INVENTION

Accordingly, the present invention is directed to a method of initializing an equalizer of a VSB DTV receiver and an equalizer using the same that substantially obviates one or more problems due to limitations and disadvantages of the related art.

An object of the present invention is to provide an equalizer-initializing method that enables viewers to quickly view a DTV irrespective of channel conditions, and an equalizer using the same.

Another object of the present invention is to provide an equalizer-initializing method capable of decreasing packaging complexity, and an equalizer using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of initializing an equalizer having a forward filter and a backward filter includes the steps of: obtaining a channel estimation value by estimating an impulse response of a channel from a received signal; initializing the backward filter by using the channel estimation value; generating an imaginary training signal by an arithmetical operation for the channel estimation value and an generated known training sequence; and initializing the forward filter by using the imaginary training signal.

Here, the step of obtaining the channel estimation value may include the steps of: delaying the field sync signal received through the channel by a length of the channel and storing the delayed signal; determining whether a length of the stored signal is identical to or above a defined length; and calculating the channel estimation value if the length of the stored signal is identical to or above the defined length.

At This time, if the length of the stored signal is below the defined length, a next signal received through the channel may be delayed by the length of the channel, and the delayed next signal may be stored.

If the length of the stored signal is identical to or above the defined length, the calculating the channel estimation value includes the steps of: stopping storing the delayed signal; and calculating the channel estimation value by using a matrix operation.

Also, the step of generating the imaginary training signal may include the steps of: setting the channel estimation value to a coefficient and generating the known training sequence; storing the generated known training sequence; and multiplying the stored known training sequence by the channel estimation value set to the coefficient and generating the imaginary training signal by adding the resulting multiplication values.

Here, the known training sequence may be a random sequence.

In another aspect of the present invention, an equalizer includes: a channel estimator for obtaining a channel estimation value by estimating an impulse response of a channel from a received signal; an FIR (finite impulse response) filter for generating an imaginary training signal by an arithmetical operation for the channel estimation value and an generated known training sequence; a backward filter initialized by using the channel estimation value; and a forward filter initialized by using the imaginary training signal.

Here, the forward filter may be electrically connected to the FIR filter, and the backward filter and the forward filter may be electrically connected.

The equalizer may further include a memory buffer for storing the received signal; a first switch for converting an electrical connection of the forward filter with the FIR filter into an electrical connection of the forward filter with the memory buffer; a delayer for delaying the generated known training sequence by a decision delay time; an operator for obtaining an error value between an input value of the backward filter and a final output value equalized by the forward filter; a slicer for slicing the equalized final output value from the forward filter; and a second switch for converting an electrical connection of the backward filter with the delayer into an electrical connection of the backward filter with the slicer.

The FIR filter may include a plurality of delayers for sequentially storing the generated known training sequence; a plurality of multipliers for multiplying the known training sequence stored in the delayers by the channel estimation value; and an adder for adding output values from the multipliers.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First, the present invention can estimate an impulse response of an input channel by using a channel estimator.

At this time, the present invention can obtain a channel estimation result through a matrix operation for a training sequence by using a channel estimator adopting a least-square algorithm (LSA).

Figure 1:
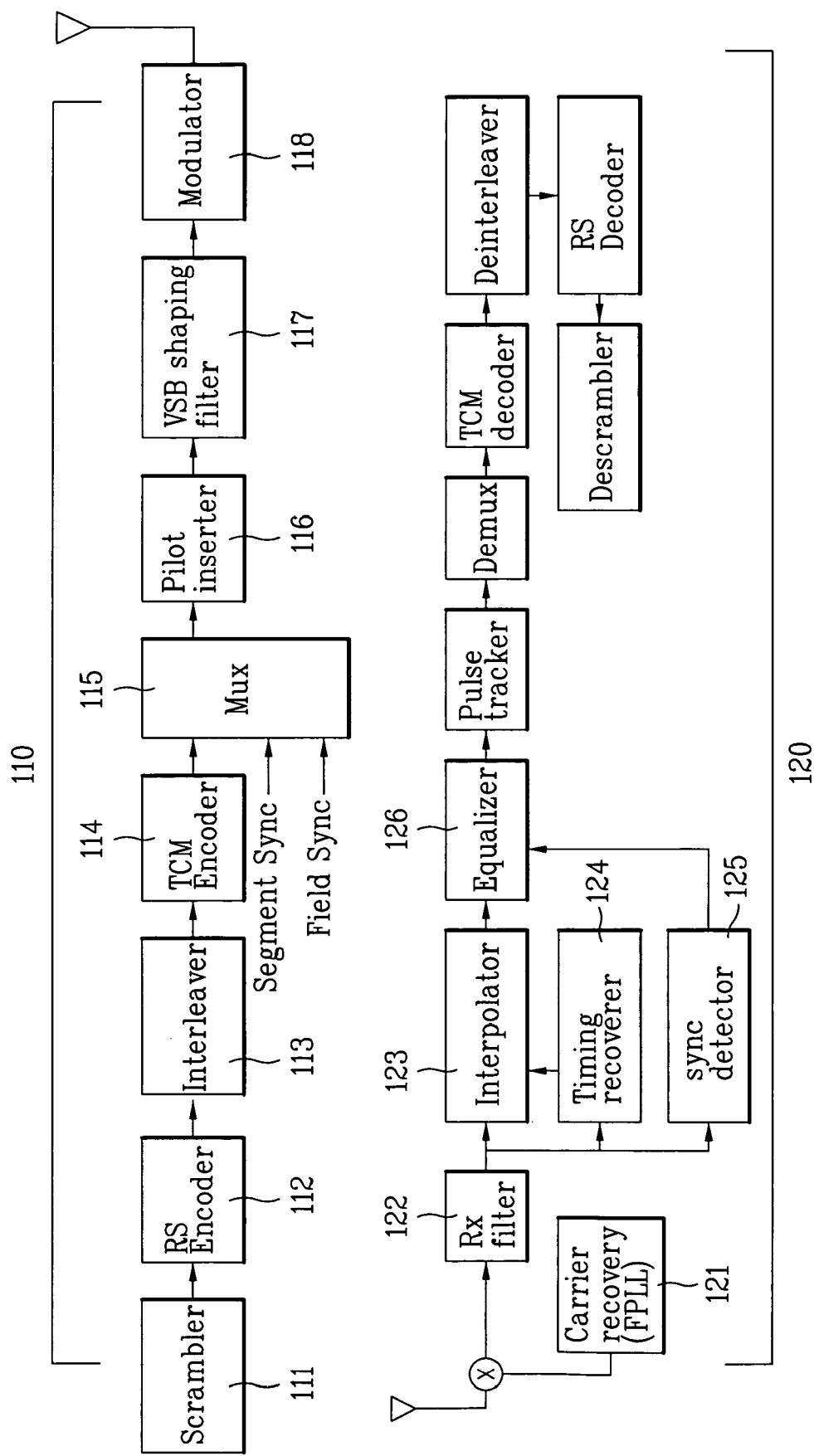
FIG. 1 is a block diagram of a general VSB DTV system.
Figure 2:
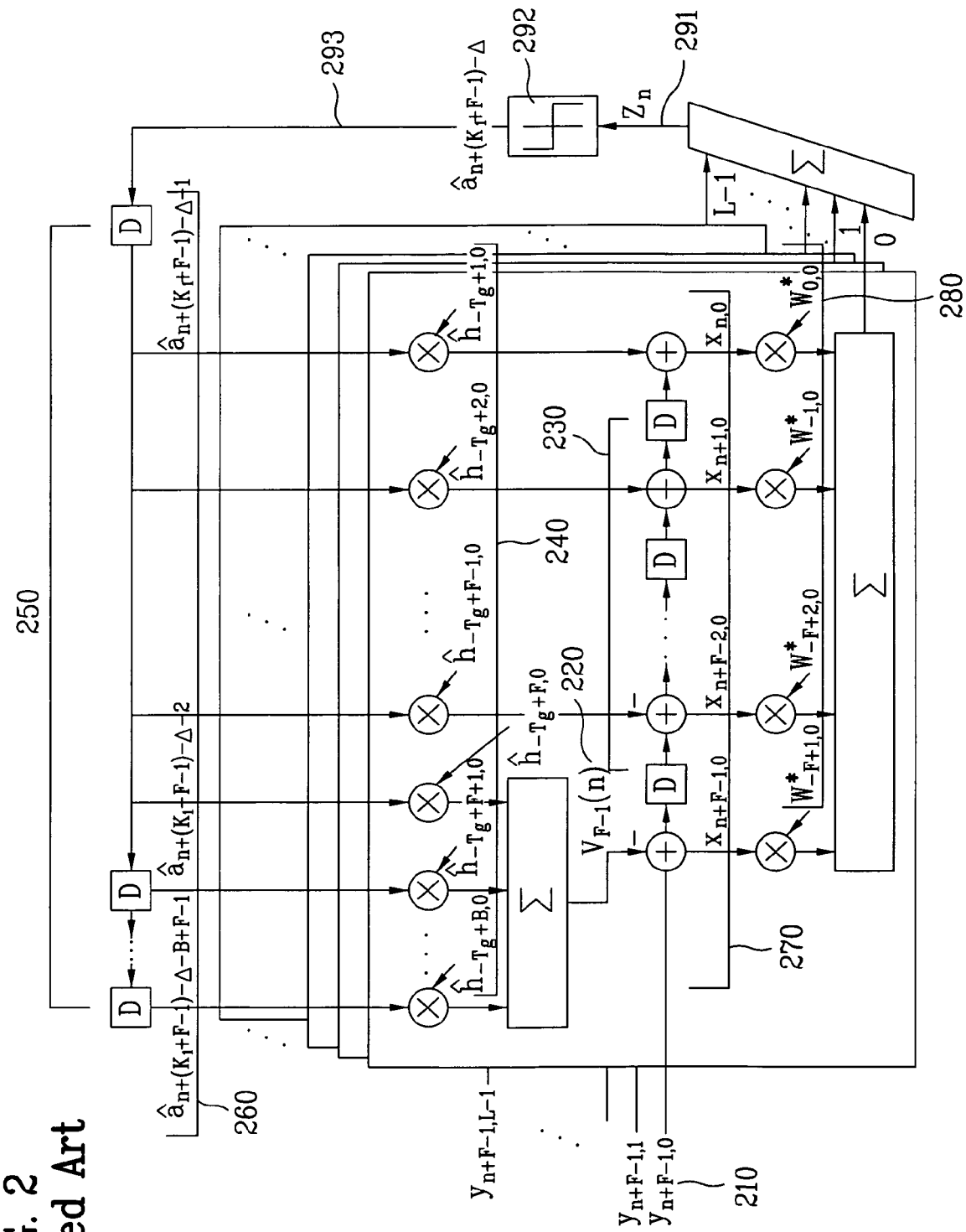
FIG. 2 is a block diagram of a general FS-MDFE.
Figure 3:
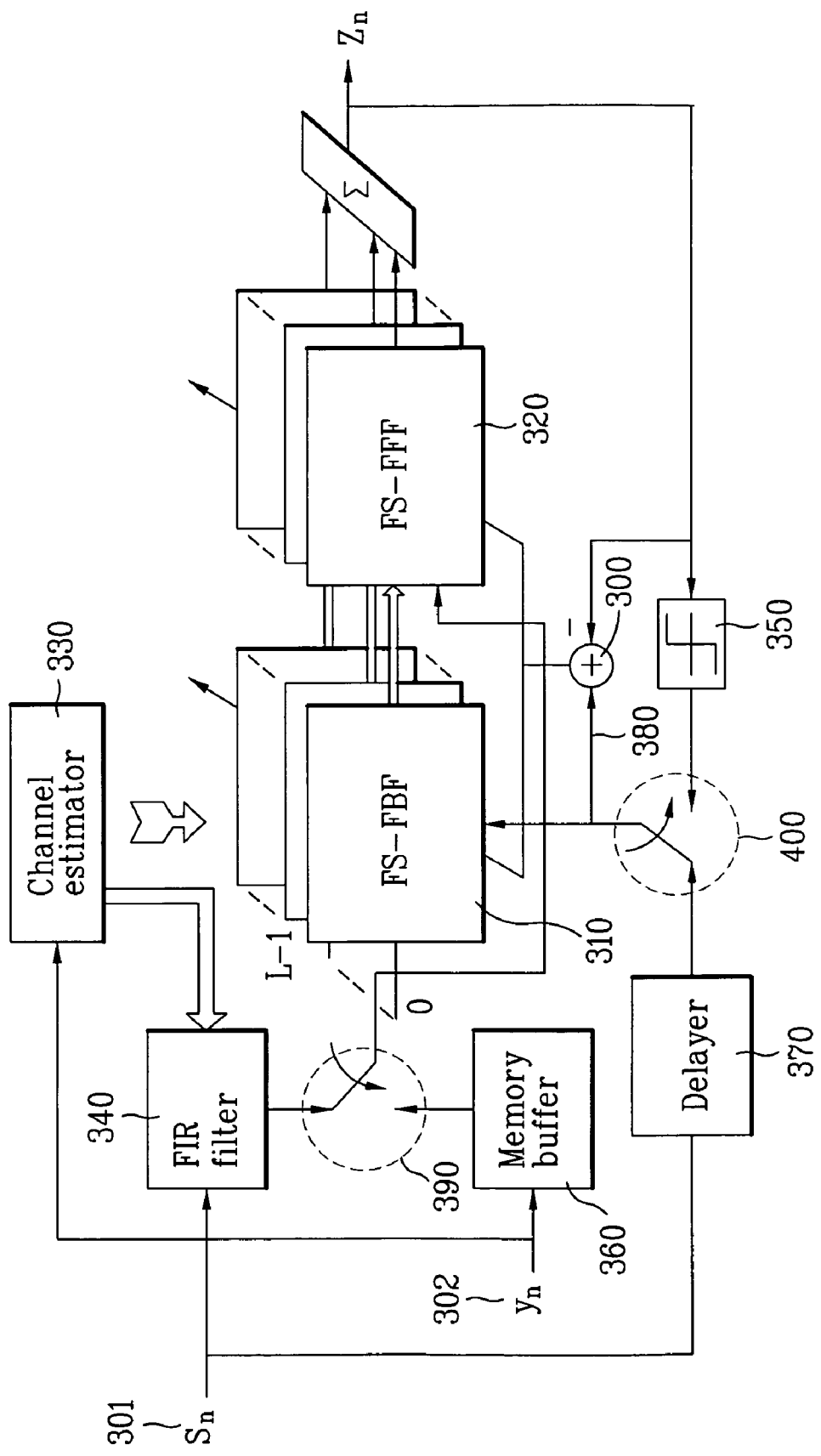
FIG. 3 is a block diagram of an FS-MDFE according to en embodiment of the present invention.

FIG. 3 is a block diagram of an FS-MDFE according to en embodiment of the present invention.

Referring to FIG. 3, the FS-MDFE according to the present invention includes a channel estimator 330, a finite impulse response (FIR) filter 340, a backward filter (FS-fBF) 310, a forward filter (FS-FFF) 320, a memory buffer 360, a first switch 390, a delayer 370, an operator 300, a slicer 350 and a second switch 400.

Here, the channel estimator 330 obtains channel estimation values by estimating impulse responses of a channel from received signals ($Y_n$) 302.

A method of obtaining the channel estimation values will be described later.

The FIR filter 340 generates imaginary training signals by an arithmetical operation for the channel estimation values and a generated known training sequence ($S_n$) 301.

Figure 4:
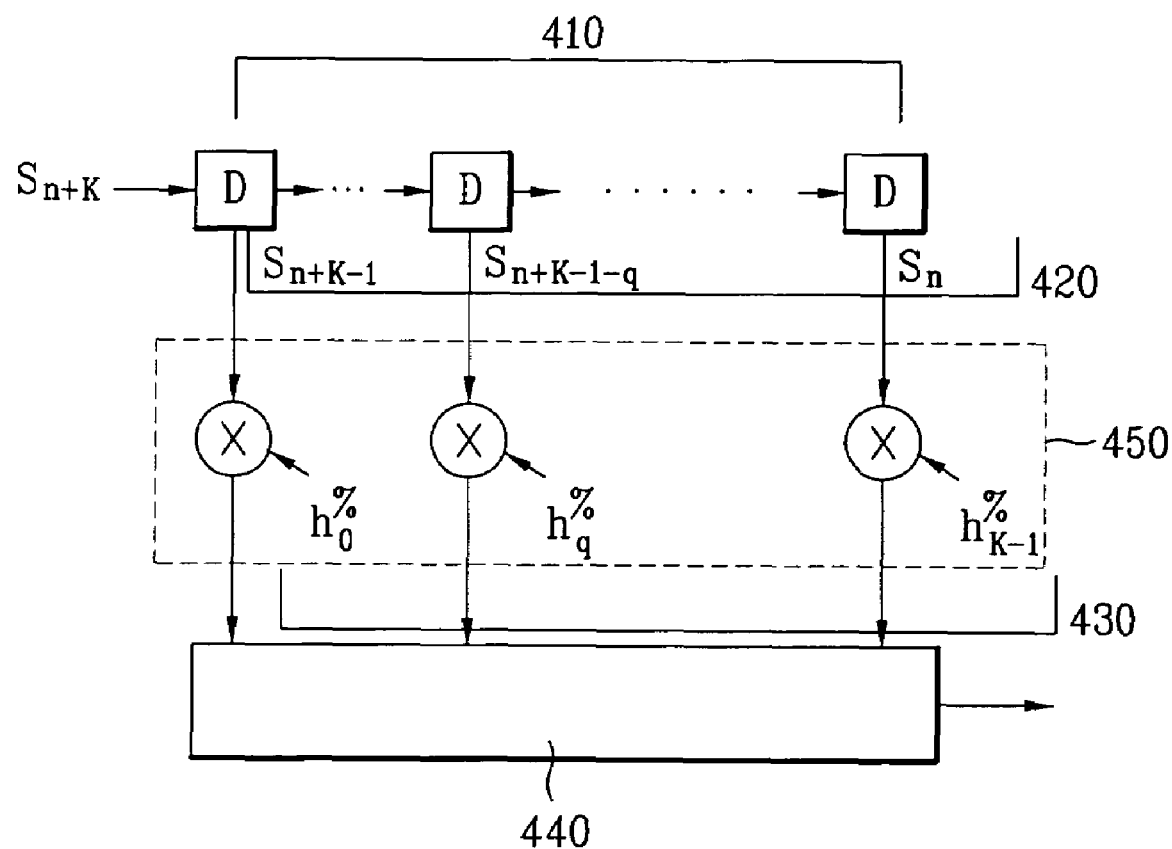
FIG. 4 is a block diagram of an FIR filter according to an embodiment of the present invention.

FIG. 4 is a block diagram of an FIR filter according to an embodiment of the present invention.

Referring to FIG. 4, the FIR filter 340 includes a plurality of delayers 410 for sequentially storing the generated known training sequence 301, a plurality of multipliers 450 for multiplying the known training sequences 420 stored in the delayers 410 by the channel estimation values 430, and an adder 440 for adding output values from the multipliers 450.

Here, the FIR filter set the channel estimation values to coefficients.

Then, the backward filter 310 is initialized by using the channel estimation values, and the forward filter 320 is initialized by using the generated imaginary training signals.

Here, the forward filter 310 is electrically connected to the FIR filter 340, and the backward filter 310 and the forward filter 320 are electrically connected.

The memory buffer 360 stores the received signals 302, and the first switch 390 converts an electrical connection of the forward filter 320 with the FIR filter 340 into an electrical connection of the forward filter 320 with the memory buffer 360.

Here, the memory buffer 360 stores the received signals 302 while the forward filter 320 is initialized, and a size of the memory buffer 360 may be identical to or above a length of the generated known training sequences 301.

Also, the delayer 370 delays the generated known training sequence 301 by a decision delay time, and the operator 300 obtains error values between input values of the backward filter 310 and final output values ($Z_n$) equalized by the forward filter 320.

Here, the known training sequence 301 may be used as reference values for obtaining the error values between the input values of the backward filter 310 and the equalized final output values $Z_n$.

The slicer 350 slices the equalized final output values $Z_n$ from the forward filter 320, and the second switch 400 converts an electrical connection of the backward filter 410 with the delayer 370 into an electrical connection of the backward filter 310 with the slicer 350.

Here, the first switch 390 and the second switch 400 convert the electrical connections upon completion of initialization of the forward filter 20.

A method of initializing the FS-MDFE will now be described in detail.

First, a baseband equivalent input signal y(t) of a DTV system can be expressed as the following Equation 1.

$$y(t) = \sum_k x_k h(t - kT) + v(t) \quad \text{(Equation 1)}$$

Here, $x_k$ is a training symbol of a DTV system, T is an interval of a symbol, h(t) is a baseband equivalent channel containing TX/RX filters of the DTV system and a channel, and v(t) is a complex Gaussian noise signal component.

At this time, if the input signal y(t) is oversampled by an interval of L/T in order to design an FS-MDFE, an input vector $y_n$ of the equalizer at a time of t=nT is expressed as the following Equation 2.

$$y_n = \sum_{k=0}^{K} x_{n-k} h_k + v_n \quad \text{(Equation 2)}$$

Here, $y_n @ [y((n+L-1/L)T) L\ y(nT)]^T = [y_{n,L-1} L\ y_{n,0}]^T$ $h_n @ [h((n+L-1/L)T) L\ h(nT)]^T = [h_{n,L-1} L\ h_{n,0}]^T.$ $v_n @ [v((n+L-1/L)T) L\ v(nT)]^T = [v_{n,L-1} L\ v_{n,0}]^T$ At this time, in order to estimate a channel by the channel estimator 330, a length K of the channel and a length L of a necessary reception signal must be determined. If a value of K and a value of L are determined, a matrix equation X necessary for an LSA (least-square algorithm) is expressed by a matrix of a size of L×K as the following Equation 3.

$$X = \begin{bmatrix} x_{K-1} & x_{K-2} & L & x_1 & x_0 \\ x_K & x_{K-1} & L & x_2 & x_1 \\ M & M & & M & M \\ x_{K+L-2} & & L & x_L & x_{L-1} \end{bmatrix} \quad \text{(Equation 3)}$$

A pseudo inverse matrix of the matrix X is defined as X', and a value of the matrix X' is then stored in the memory buffer for an LS (Least-Square) operation.

Figure 5:
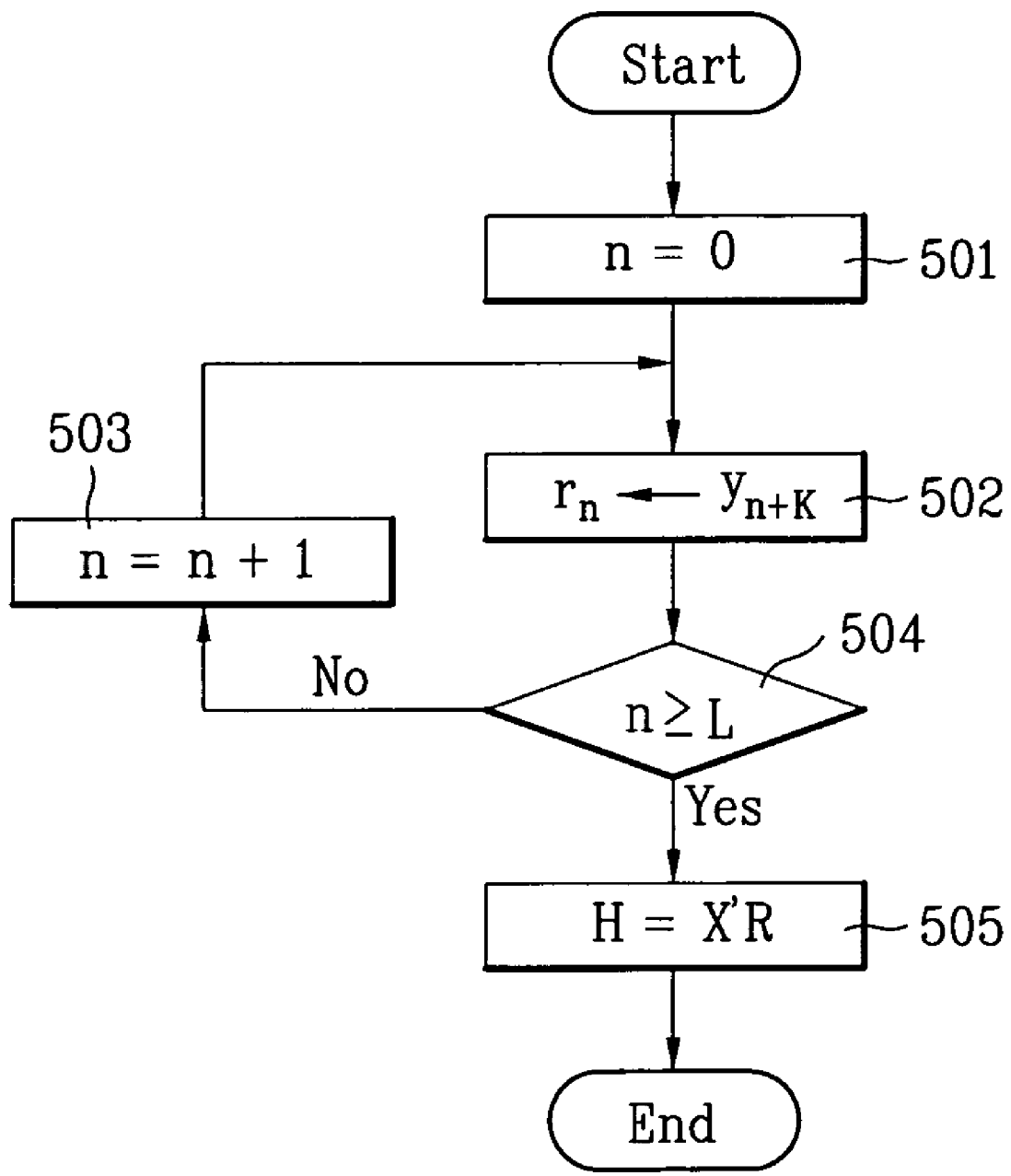
FIG. 5 is a flow diagram illustrating a channel-estimating method according to en embodiment of the present invention.

FIG. 5 is a flow diagram illustrating a channel-estimating method according to en embodiment of the present invention. The channel-estimating method will now be described with reference to FIG. 5.

Referring to FIG. 5, a receiver delays a signal yn received through a channel by a length K of the channel.

Then, the receiver stores the delayed signal $y_{n+K}$ in a memory. At this time, the delayed signal $y_{n+K}$ is defined as $r_n$ (Steps 501 and 502).

Thereafter, the receiver determines whether a length of the signal $y_{n+K}$ stored in the memory is identical to or above a defined length L of a reception signal (Step 504).

If the length of the stored signal is identical to or above the defined length, the receiver stops storing the delayed signal and calculates channel estimation values by using a matrix operation (Step 505).

If the length of the stored signal is below the defined length, the receiver delays a next signal received through the channel by a length of the channel, and stores the delayed next signal (Step 503).

Here, the length of the channel and the defined length may be predetermined prior to storing the delayed signal.

A matrix equation H obtained through the arithmetical operation process corresponds to the channel estimation values, and matrix equations H and R are expressed as the following Equation 4.

$$H = [h_0^* h_1^* L\ h_{K-1}^*]\ R = [r_0\ r_1\ L\ r_{L-1}]^T \quad \text{(Equation 4)}$$

In this manner, the present invention can initiate the backward filter (FS-FBF) 310 by using the channel estimation values obtained by the channel estimator 330.

Also, the present invention can initiate the forward filter (FS-FFF) 320 by using the channel estimation values obtained by the channel estimator 330, the backward filter 310 and other devices.

Referring back to FIG. 3, the receiver sets the channel estimation values obtained by the channel estimator 330 to coefficients of the FIR filter 340.

Thereafter, the known training sequence (S(n)) 301 is inputted to the FIR filter 340.

At this time, the FIR filter 340 has the same structure as a general filter. A structure of the FIR filter 340 is illustrated in detail in FIG. 4.

Referring to FIG. 4, the FIR filter 340 sequentially stores the input signal S(n) in the delayer 410, multiples the values 420 stored in the delayers 410 by the filter's coefficients 430, namely the channel estimation values, and adding the resulting values at the adder 440.

Accordingly, the known training sequence S(n) has a length of N that is long enough for an FS-MDFE to be converged with respect to a non-minimum phase channel. Here, a random sequence and other sequences can be used as the known training sequence.

In a DTV system, most channels can be initialized by an imaginary training sequence of about 5000 symbols.

If the channel estimation values of the channel estimator has no error, a generated imaginary training signal in receiver is identical to a training signal transmitted from a transmitter through a channel. If the channel estimation error is small, two signals (that is, a training signal transmitted from a transmitter and a imaginary training signal generated in a receiver) may be considered to be almost the same.

Accordingly, the present invention inputs a imaginary training signal obtained by the FIR filter to the FS-MDFE, and thereby can train the forward filter by using an LMS adaptation training algorithm.

At this time, a value obtained by delaying the known training sequence S(n) by a decision delay time of the FS-MDFE can be used as a reference value 380 used for obtaining an error between an input of the backward filter and an output of the FS-MDFE.

At this time, the receiver must store an input signal $y_n$ received by the FS-MDFE in the memory buffer 360 while the forward filter is initialized through the imaginary training signal.

Here, a size of the memory buffer 360 may be identical to or above a length N of the imaginary training sequence.

Upon completion of initialization of the FS-MDFE by the FIR filter shown in FIG. 4, the receiver initializes the values stored in memories of the forward filter and the backward filter to '0', and then converts an electrical connection of the forward filter 320 to the FIR filter 340 into an electrical connection of the forward filter 320 to the memory buffer 360 so that an output of the memory buffer 360 is connected to an input of the forward filter 320.

Also, the receiver converts an electrical connection of the backward filter 310 with the delayer 370 into an electrical connection of the backward filter 310 to the slicer 350 so that an output of the slicer 350 is used as the reference value 380.

The method of initializing the equalizer according to the present invention is as follows.

The present invention obtains a channel estimation value by estimating an impulse response of a channel from a received signal, initializes the backward filter by using the channel estimation value.

Thereafter, the present invention generates an imaginary training signal by an arithmetical operation for the channel estimation value and an generated known training sequence, and then initializes the forward filter by using the generated imaginary training signal.

The method of calculating the channel estimation value according to the present invention is as follows.

Firstly, the present invention delays a signal received through a channel by a length of the channel, and stores the delayed signal.

Then, the present invention determines whether a length of the stored signal is identical to or above a defined length. If the length of the stored signal is identical to or above the defined length, the present invention stops storing the delayed signal, and calculates the channel estimation value by using a matrix operation.

Here, if the length of the stored signal is below the defined length, the present invention delays a next signal received through the channel by the length of the channel, and stores the delayed next signal.

Also, the present invention may predetermine the length of the channel and the defined length prior to storing the delayed signal.

The method of generating the imaginary training signal according to the present invention is as follows.

Firstly, the present invention sets the channel estimation value to a coefficient, and generates the known training sequence.

Thereafter, the present invention stores the generated known training sequence, multiplies the stored known training sequence by the channel estimation value set to the coefficient, and generates the imaginary training signal by adding the resulting multiplication values.

Here, the known training sequence may be a random sequence.

As described above, the present invention has the following advantages.

First, the present invention makes it possible to perform an equalization operation with respect to a channel hard to be equalized.

Secondly, the present invention makes it possible to quickly initialize an equalizer.

Thirdly, the present invention needs less training time than a general equalizer.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of initializing an equalizer including a forward filter and a backward filter, the method comprising:
    obtaining a channel estimation value by estimating an impulse response of a channel from a received signal;
    initializing the backward filter by using the channel estimation value;
    generating an imaginary training signal by an arithmetical operation for the channel estimation value and a generated known training sequence; and
    initializing the forward filter by using the imaginary training signal,
    wherein obtaining the channel estimation value further comprises:
        delaying the signal received through the channel by a length of the channel, and storing the delayed signal;
        determining whether a length of the stored signal is identical to or greater than a defined length; and
        calculating the channel estimation value if the length of the stored signal is identical to or greater than the defined length.

2. The method of claim 1, wherein if the length of the stored signal is less than the defined length, a next signal received through the channel is delayed by the length of the channel, and the delayed next signal is stored.

3. The method of claim 1, wherein if the length of the stored signal is identical to or greater than the defined length, calculating the channel estimation value comprises:
    stopping storing the delayed signal; and
    calculating the channel estimation value by using a matrix operation.

4. The method of claim 1, further comprising predetermining the length of the channel and the defined length prior to storing the delayed signal.

5. The method of claim 1, wherein generating the imaginary training signal comprises:

setting the channel estimation value to a coefficient and generating the known training sequence;

storing the generated known training sequence; and multiplying the stored known training sequence by the channel estimation value set to the coefficient, and generating the imaginary training signal by adding the resulting multiplication values.

6. The method of claim 1, wherein the known training sequence is a random sequence.

7. An equalizer, comprising:

a channel estimator for obtaining a channel estimation value by estimating an impulse response of a channel from a received signal;

an FIR (finite impulse response) filter for generating an imaginary training signal by an arithmetical operation for the channel estimation value and a generated known training sequence;

a backward filter initialized by using the channel estimation value;

a forward filter initialized by using the imaginary training signal;

a memory buffer for storing the received signal;

a first switch for converting an electrical connection of the forward filter with the FIR filter into an electrical connection of the forward filter with the memory buffer;

a delayer for delaying the generated known training sequence by a decision delay time;

an operator for obtaining an error value between an input value of the backward filter and a final output value equalized by the forward filter;

a slicer for slicing the equalized final output value from the forward filter; and a second switch for converting an electrical connection of the backward filter with the delayer into an electrical connection of the backward filter with the slicer.

8. The equalizer of claim 7, wherein the forward filter is electrically connected to the FIR filter, and the backward filter and the forward filter are electrically connected.

9. The equalizer of claim 7, wherein the memory buffer stores the received signal while the forward filter is initialized.

10. The equalizer of claim 7, wherein a size of the memory buffer is identical to or greater than a length of the generated known training sequence.

11. The equalizer of claim 7, wherein the first switch and the second switch convert the electrical connection upon completion of initialization of the forward filter.

12. The equalizer of claim 7, wherein the known training sequence is used as a reference value for obtaining the error value between the input value of the backward filter and the equalized final output value.

13. The equalizer of claim 7, wherein the FIR filter comprises:

a plurality of delayers for sequentially storing the generated known training sequence;

a plurality of multipliers for multiplying the known training sequence stored in the delayers by the channel estimation value; and an adder for adding output values from the multipliers.

14. The equalizer of claim 13, wherein the FIR filter sets the channel estimation value to a coefficient.

* * * * *